UNITED STATES PATENT OFFICE.

CHARLES LOWE, OF REDDISH, NEAR STOCKPORT, COUNTY OF LANCASTER, ENGLAND.

MANUFACTURE OF DERIVATIVES OF AURIN.

SPECIFICATION forming part of Letters Patent No. 333,649, dated January 5, 1886.

Application filed July 5, 1884. Renewed October 3, 1885. Serial No. 178,904. (Specimens.) Patented in England November 22, 1882, No. 5,554.

*To all whom it may concern:*

Be it known that I, CHARLES LOWE, a subject of the Queen of Great Britain, residing at Reddish, near Stockport, in the county of Lancaster, England, manufacturing chemist, have invented a certain new and useful Improvement in the Manufacture of Derivatives of Aurin, (for which I have obtained Letters Patent in Great Britain, No. 5,554, dated November 22, 1882;) and I do hereby declare that the following is a full, clear, and exact description of the invention, which will enable others skilled in the art to which it appertains to make and use the same.

The object of my invention is to manufacture from coal-tar products, by a new and improved process, conjugated acid red-coloring matter, which I designate "rosophenolinesulphonic acid," and I effect this object by the following method:

I take one part aurin or yellow coralline and heat it at a low temperature—between one hundred degrees and two hundred and twelve degrees (100° and 212°) Fahrenheit—with five parts sulphuric acid, so as to convert it into aurinsulphonic acid; and the product obtained, after separation of the excess of sulphuric acid in the usual manner well known to chemists, I heat with ammonia, either in aqueous, ethylic, phenylic, or other alcoholic solution, either in open vessels at ordinary atmospheric pressure or in closed vessels at pressures exceeding that of the atmosphere, until the coloring-matter designated by me under the name of "rosophenolinesulphonic acid" is produced. The ammoniacal salt of the rosophenolinesulphonic acid thus prepared may be employed for dyeing purposes as such, or may be further purified by any of the well-known general processes applicable to the purification of sulphonic acids and their salts.

Having stated the nature of my invention and described the manner of performing the same, I declare that what I claim as my invention, and desire to secure by Letters Patent of the United States, is—

The process of manufacturing the described derivative of aurin, consisting in the following steps: first, heating one part of aurin with five parts sulphuric acid at a temperature between 100° and 212° Fahrenheit; second, separating the excess of sulphuric acid in the usual manner; third, heating the product with an aqueous or alcoholic solution of ammonia until the coloring-matter designated by me "rosophenolinesulphonic acid" is produced.

The foregoing specification of my improvement in the manufacture of coloring-matters from coal-tar products signed by me this 21st day of June, 1884.

CHAS. LOWE.

Witnesses:
   S. I. BOWYER,
   GEO. HODGETTS,
*Both of Chemical Works, Reddish, nr. Stockport.*